US010102995B2

(12) United States Patent
Rosenquist

(10) Patent No.: US 10,102,995 B2
(45) Date of Patent: Oct. 16, 2018

(54) FUSE CUTOUT MONITORING AND INDICATION DEVICE

(71) Applicant: IoT Sensor Corporation, Scituate, MA (US)

(72) Inventor: Craig Hamilton Rosenquist, Scituate, MA (US)

(73) Assignee: IOT SENSOR CORPORATION, Scituate, MA (US)

( * ) Notice: Subject to any disclaimer, the term of this patent is extended or adjusted under 35 U.S.C. 154(b) by 0 days.

(21) Appl. No.: 15/458,575

(22) Filed: Mar. 14, 2017

(65) Prior Publication Data

US 2017/0263406 A1 Sep. 14, 2017

Related U.S. Application Data

(60) Provisional application No. 62/307,751, filed on Mar. 14, 2016.

(51) Int. Cl.

| | |
|---|---|
| ***H01H 85/02*** | (2006.01) |
| ***H01H 35/02*** | (2006.01) |
| ***H01H 85/32*** | (2006.01) |
| ***H01H 85/175*** | (2006.01) |
| ***H01H 36/00*** | (2006.01) |
| ***G01S 19/14*** | (2010.01) |
| ***H01H 85/54*** | (2006.01) |
| *H01H 31/00* | (2006.01) |
| *H01H 31/12* | (2006.01) |

(52) U.S. Cl.
CPC ......... *H01H 85/0241* (2013.01); *G01S 19/14* (2013.01); *H01H 35/02* (2013.01); *H01H 36/0006* (2013.01); *H01H 85/32* (2013.01); *H01H 85/545* (2013.01); *H01H 31/006* (2013.01); *H01H 31/125* (2013.01)

(58) Field of Classification Search
CPC ........... H01H 85/0241; H01H 36/0006; H01H 35/02; H01H 85/545; H01H 85/32; H01H 31/006; H01H 31/125; G01S 19/14
USPC .......................................................... 337/241
See application file for complete search history.

(56) References Cited

U.S. PATENT DOCUMENTS 3,810,060 A * 5/1974 Hubbard .............. H01H 31/127 337/155
4,045,762 A * 8/1977 Foulkes ............... H01H 31/127 200/61.08

(Continued)

*Primary Examiner* — Anatoly Vortman

(57) ABSTRACT

A device for monitoring and indicating a fuse tube detachment from a fuse cutout assembly contains a structural body, a tilt switch, a power source, a visual indicator, and an attachment mechanism. The attachment mechanism is used to mount the device onto the fuse tube. The tilt switch monitors the position of the fuse tube. More specifically, when the vertical position of the fuse tube changes to the dropped position the tilt switch is triggered. Thus, the visual indicator is illuminated. The illumination aids in the process of discovering the detached fuse tube. In addition to the visual indicator, the device can also be equipped with a wireless communication device and an alarm system. The wireless communication device can be used to provide the exact location of the detached fuse tube. On the other hand, the alarm system can be used to expedite the process of discovering the detached fuse tube.

13 Claims, 10 Drawing Sheets

15 1 100 6 5 4

6 5 200 15 1 100

(56) References Cited

U.S. PATENT DOCUMENTS

| | | | | |
|---|---|---|---|---|
| 4,661,807 | A * | 4/1987 | Panaro | G01R 31/02 337/206 |
| 6,144,284 | A * | 11/2000 | Santa Cruz | H01H 85/32 116/202 |
| 6,527,077 | B2 * | 3/2003 | Yamamoto | B62J 99/00 180/220 |
| 6,687,110 | B2 * | 2/2004 | Murray | H01H 33/6661 337/142 |
| 7,109,877 | B2 * | 9/2006 | Cuk | H01H 85/30 324/457 |
| 7,948,352 | B2 * | 5/2011 | Tang | H01H 31/127 337/171 |
| 8,059,006 | B2 * | 11/2011 | Schweitzer, III | H04Q 9/00 340/521 |
| 8,168,901 | B2 * | 5/2012 | Haj-Maharsi | H01H 31/127 200/48 R |
| 8,344,844 | B2 * | 1/2013 | Darr | H01H 9/168 337/143 |
| 9,099,270 | B2 * | 8/2015 | Zulkowski | H01H 85/32 |
| 9,583,297 | B2 * | 2/2017 | Benke | H01H 85/306 |
| 2010/0230263 | A1 * | 9/2010 | Haj-Maharsi | H01H 31/127 200/48 R |
| 2012/0299739 | A1 * | 11/2012 | Zulkowski | H01H 31/127 340/638 |
| 2013/0205900 | A1 * | 8/2013 | Nulty | H02J 3/00 73/514.01 |
| 2015/0287564 | A1 * | 10/2015 | Benke | H01H 85/306 337/5 |
| 2017/0059640 | A1 * | 3/2017 | Haensgen | G01R 31/07 |

* cited by examiner

[ Replacement Sheet ]

[ Replacement Sheet ]

FUSE CUTOUT MONITORING AND INDICATION DEVICE

The current application claims a priority to the U.S. Provisional Patent application Ser. No. 62/307,751 filed on Mar. 14, 2016.

FIELD OF THE INVENTION

The present invention relates generally to safety equipment in the field of power systems. More specifically, the present invention is a fuse cutout monitoring device that is to be used on an electric power distribution system.

BACKGROUND OF THE INVENTION

In power distribution systems, a fuse cutout is a combination of a fuse and a switch. The fuse cutout is used in primary overhead lines. As an example, one use of the existing fuse cutouts is to protect distribution transformers from current surges and overloads. When an overcurrent is caused by a fault in the transformer or the customer circuit, the fuse melts within the fuse tube. The melting results in the transformer being disconnected from the line. The detachment from the line is executed by detaching a fuse tube of the fuse cutout assembly.

With existing fuse cutout assemblies, the detached fuse tube needs to be discovered prior to executing any repair activities. Searching for a detached fuse tube can be extremely time consuming especially during low light conditions. The amount of time spent on discovering the detached fuse tube can be disadvantageous when the power distribution system needs to be repaired within a short time. Therefore, the need for a method that can promptly notify the authorities regarding the detached fuse tube is necessary.

A fuse cutout monitoring and indication device should not change the overall structure of the existing fuse cutouts or the overall functionality of the existing fuse cutouts. In other words, the fuse cutout monitoring device needs to be used with any existing power distribution system with fuse cutouts. The inability to be used with any existing fuse cutout can be financially disadvantageous since the fuse cutout needs to be redesigned to accommodate the fuse cutout monitoring device.

The objective of the present invention is to address the described issues. More specifically, the present invention introduces an apparatus that promptly notifies an individual of the fuse cutout status. Therefore, the issue can be addressed immediately and the necessary repairs to the power line can be performed accordingly. The present invention is designed to be used as a retrofit. Therefore, the present invention can be used with any existing fuse cutout without making any adjustments to the fuse cutout. Moreover, the mounting method used when installing the present invention on the fuse tube eliminates the need to disconnect the electrical power supply.

DETAIL DESCRIPTIONS OF THE INVENTION

Figure 1:
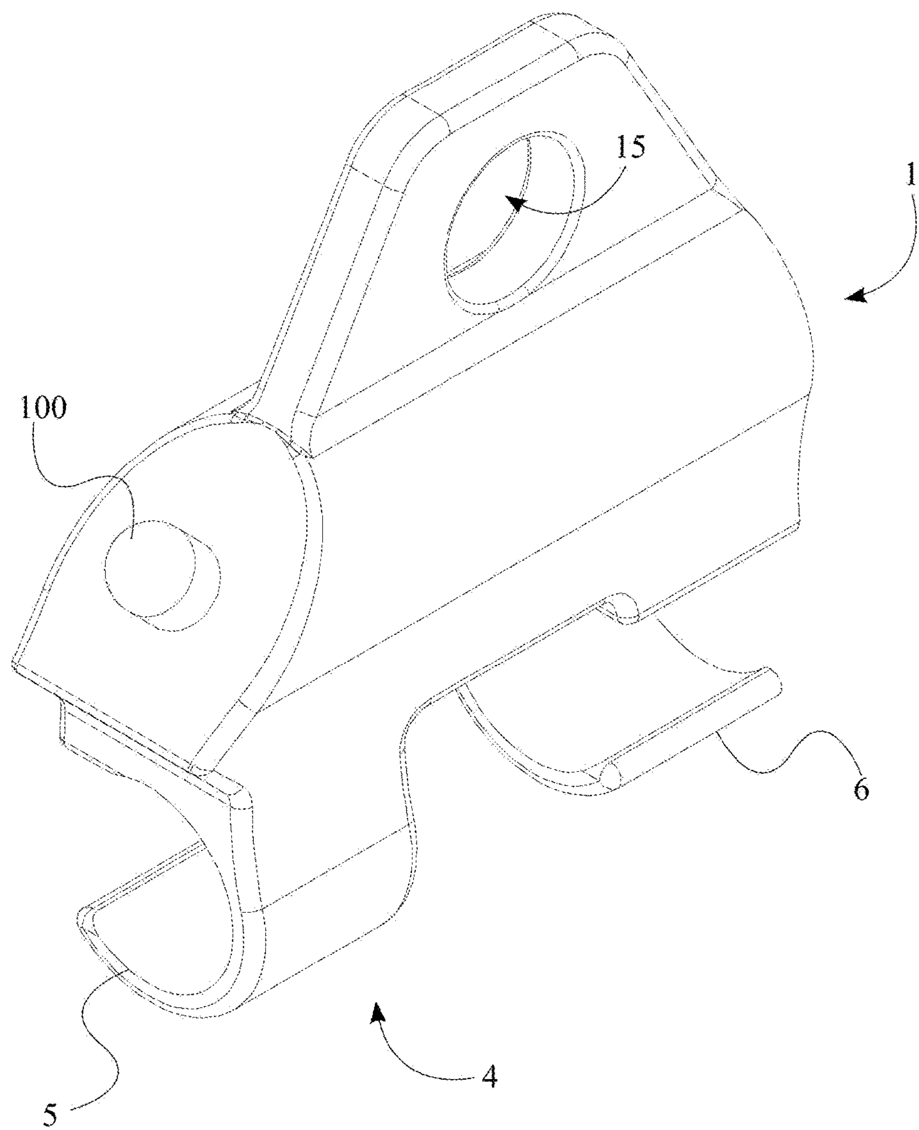
FIG. 1 is a perspective view of the present invention.
Figure 2:
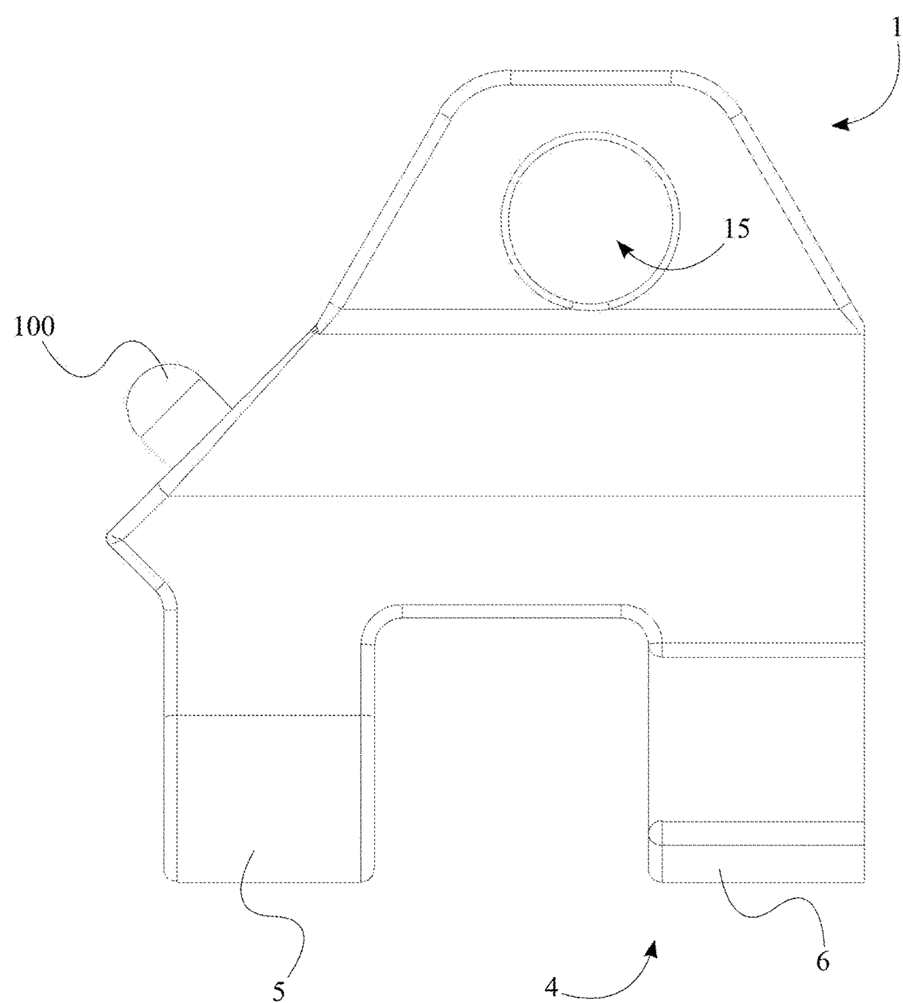
FIG. 2 is a side view of the present invention.

All illustrations of the drawings are for the purpose of describing selected versions of the present invention and are not intended to limit the scope of the present invention.

The present invention introduces a fuse cutout monitoring and indication device. More specifically, the present invention is a device that detects the detachment of a fuse tube from the attachment hooks of a fuse cutout and therefore is in a dropped position. When the detachment is detected, the present invention provides a visual alert or other comparable alert so that the location of the detached fuse tube can be found promptly. To do so, the present invention is designed as a retrofit that can be attached to the fuse tube of a fuse cutout.

As illustrated in FIGS. 1-3 and FIG. 6, the present invention comprises a structural body 1, a tilt switch 2, a power source 3, a visual indicator 100, and an attachment mechanism 4. The structural body 1 gives the overall size and shape of the invention and holds the remaining components of the present invention. The size and shape of the structural body 1 can vary in different embodiments of the present invention. Moreover, the material of the structural body 1 can also vary in different embodiments of the present invention. Preferably, the structural body 1 is made of a lightweight material for user convenience. In the preferred embodiment of the present invention, the tilt switch 2 and the power source 3 are positioned within the structural body 1. The tilt switch 2 is used to detect the detachment of a fuse tube 200. More specifically, the tilt switch 2 is used to identify when the fuse tube 200 detaches from its original vertical positioning on the fuse cutout to a dropped position. When the tilt switch 2 is activated, the visual indicator 100 is triggered to notify the detachment of the fuse tube 200 from the fuse cutout. To do so, the tilt switch 2 and the visual indicator 100 are electronically connected to each other. For the visual indicator 100 to be clearly seen, the visual indicator 100 is externally mounted onto the structural body 1 and protrudes from the structural body 1. More specifically, the visual indicator 100 protrudes outwards from the structural body 1. In the preferred embodiment of the present invention, the visual indicator 100 is at least one light emitting diode (LED). However, the visual indicator 100 can vary in different embodiments of the present invention. The power source 3 provides the necessary power for the present invention to function as required. In doing so, the power source 3 is electrically connected to the tilt switch 2 and the visual indicator 100. The power source 3 can vary in different embodiments of the present invention. The power source 3 can be, but is not limited to, hydride batteries, alkaline batteries, lithium-ion batteries, nickel-cadmium batteries or other comparable batteries. As mentioned before, the present invention is attached to the fuse tube 200 of a fuse cutout. The attachment mechanism 4 is used to removably attach the present invention to the fuse tube 200. To conveniently attach or detach the present invention, the attachment mechanism 4 is externally connected to the structural body 1.

Figure 3:
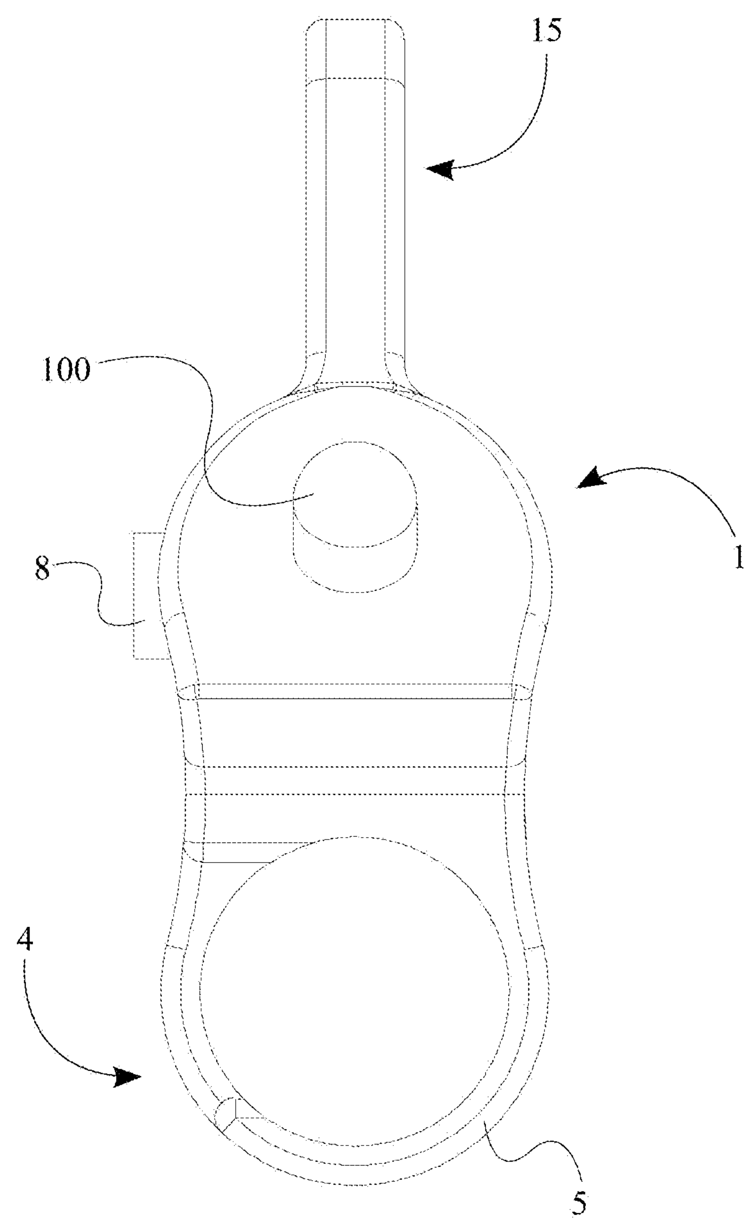
FIG. 3 is a front view of the present invention.
Figure 4:
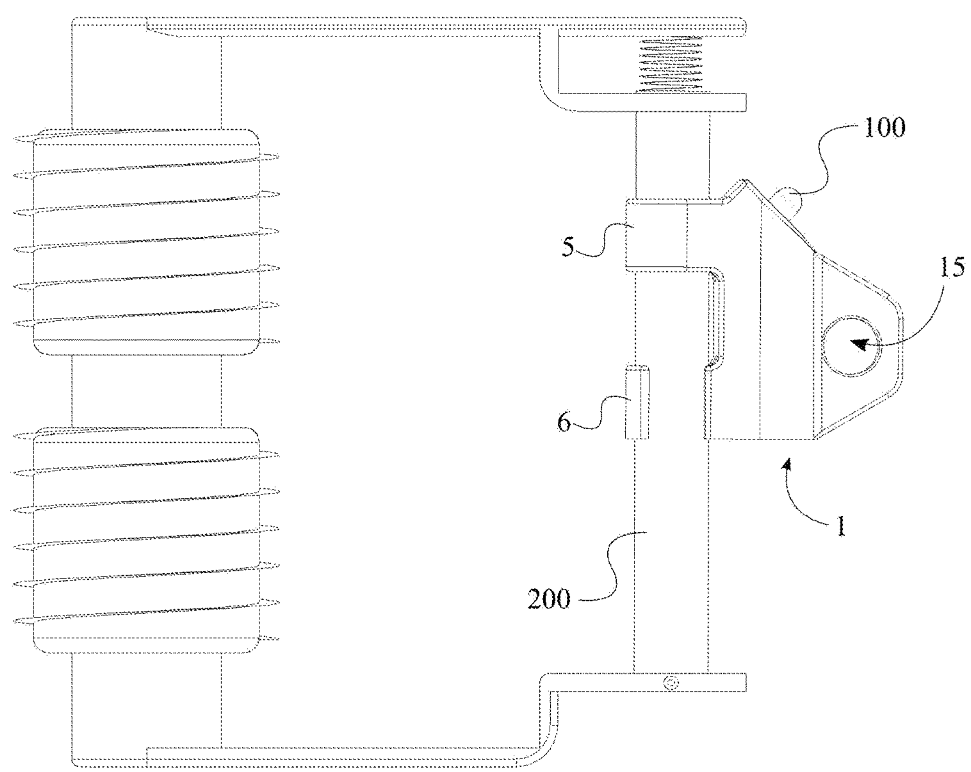
FIG. 4 is an illustration of the present invention attached to a fuse tube of a fuse cutout.

The attachment mechanism 4 can vary in different embodiments of the present invention. In the preferred embodiment of the present invention, the attachment mechanism 4 comprises a first mounting clip 5 and a second mounting clip 6 which are connected to the structural body 1. The first mounting clip 5 and the second mounting clip 6 are designed to appropriately grip the fuse tube 200. Since the fuse tube 200 is cylindrical in shape, the first mounting clip 5 and the second mounting clip 6 are designed to receive a cylindrical body as seen in FIG. 3 and FIG. 4. To maintain a firm grip on the fuse tube 200, the first mounting clip 5 is positioned adjacent the second mounting clip 6. Moreover, for convenient attaching and detaching, the first mounting clip 5 and the second mounting clip 6 are positioned directionally opposed to each other Wherein the first mounting clip 5 and the second mounting clip 6 are axially aligned to each other.

Figure 6:
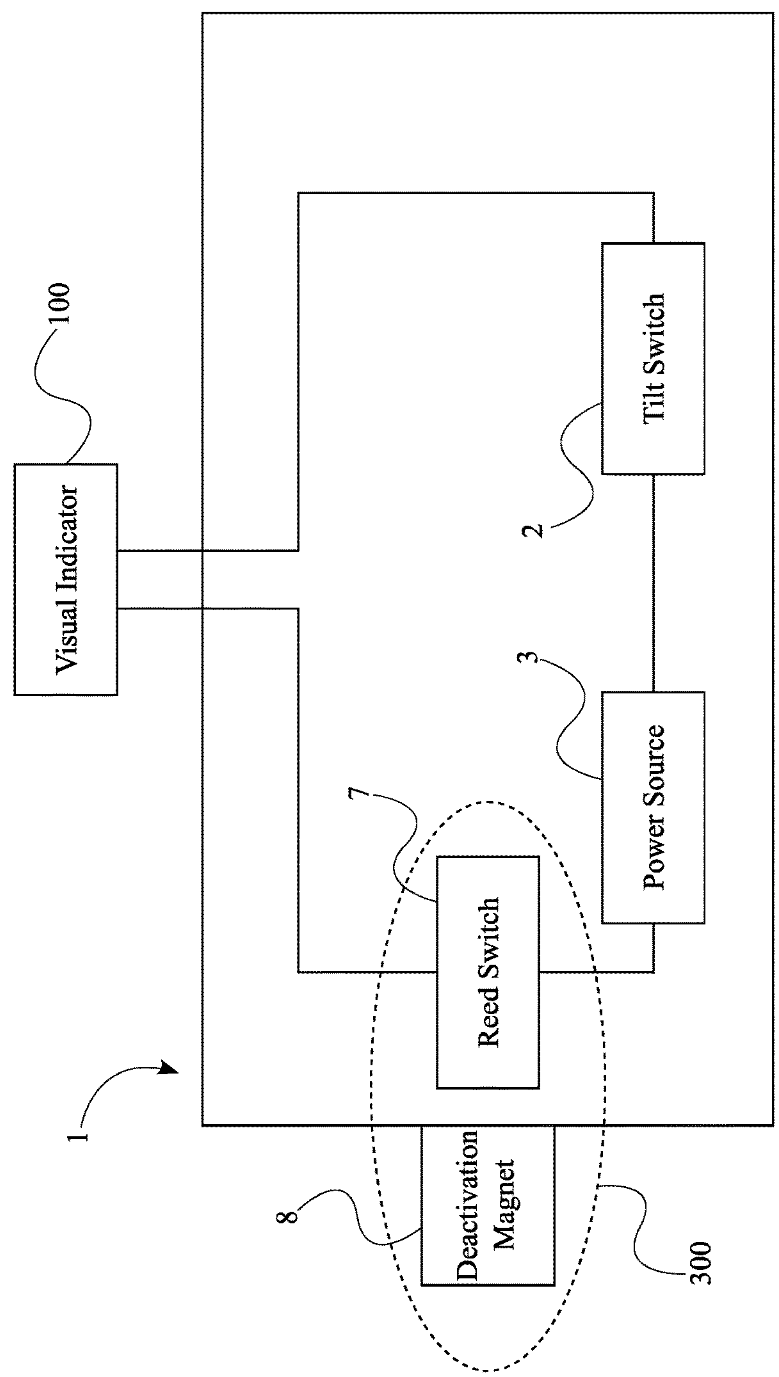
FIG. 6 is a block diagram illustrating the use of the deactivation magnet and the reed switch.

To prevent the visual indicator 100 from being triggered prior to being attached to the fuse tube 200, the present invention further comprises a reed switch 7 and a deactivation magnet 8. The reed switch 7, which is electrically connected to the power source 3, generally has closed terminals which would open when positioned within a magnetic field. A magnetic field 300 of the deactivation magnet 8 is used to control the reed switch 7 as necessary. The reed switch 7 is positioned within the structural body 1. More specifically, the reed switch 7 is positioned to be within the magnetic field 300 of the deactivation magnet 8 as seen in FIG. 6. To provide the required magnetic field 300 to the reed switch 7 as preferred, the deactivation magnet 8 is removably mounted onto the structural body 1. In the preferred embodiment of the present invention, when the deactivation magnet 8 is attached to the structural body 1, the current is diverted away from the visual indicator 100. Therefore, the present invention can be moved from one location to another without the risk of triggering the visual indicator 100. As illustrated in FIG. 6, the tilt switch 2, the visual indicator 100, and the reed switch 7 are electronically connected to each other for the visual indicator 100 to correspond with the deactivation magnet 8 and the reed switch 7.

Figure 7:
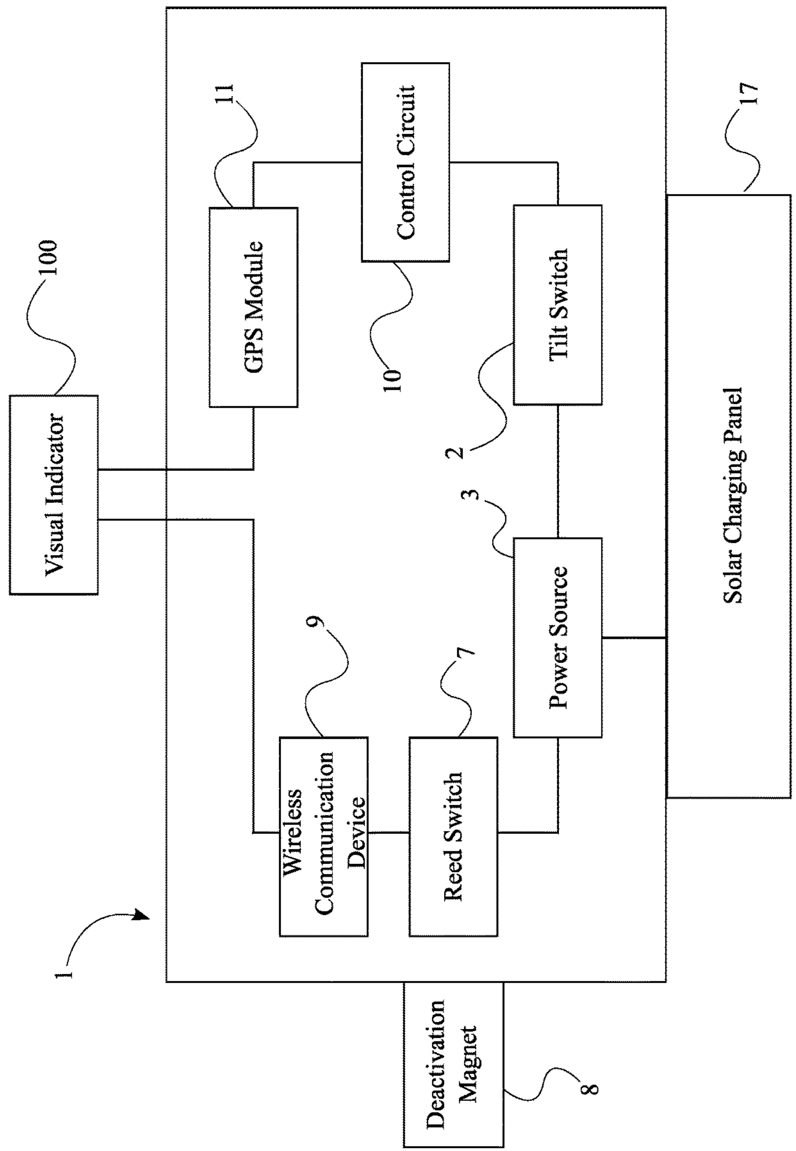
FIG. 7 is a block diagram illustrating the use of the wireless communication device, the control circuit, and the GPS module.

The present invention can be designed to wirelessly transmit information regarding the detachment of the fuse tube 200. To do so, the present invention further comprises a wireless communication device 9 and a control circuit 10 as shown in FIG. 7. The wireless communication device 9, which is electrically connected to the power source 3, transmits and receives data related to the detachment of the fuse tube 200. Moreover, the wireless communication device 9 is positioned within the structural body 1. The control circuit 10, which is positioned within the structural body 1, manages data related to transmitting and receiving information. The tilt switch 2, the control circuit 10, the visual indicator 100, and the wireless communication device 9 are electronically connected to each other so that information can be transmitted or received accurately.

The present invention can be designed to transmit location information of the detached fuse tube 200. To do so, the present invention further comprises a global positioning system (GPS) module 11 as further illustrated in FIG. 7. The power source 3 is electrically connected to the GPS module 11 to provide the necessary power. For the location information to be transferred to the wireless communication device 9, the GPS module 11 is electronically connected to the wireless communication device 9 and the control circuit 10.

Figure 8:
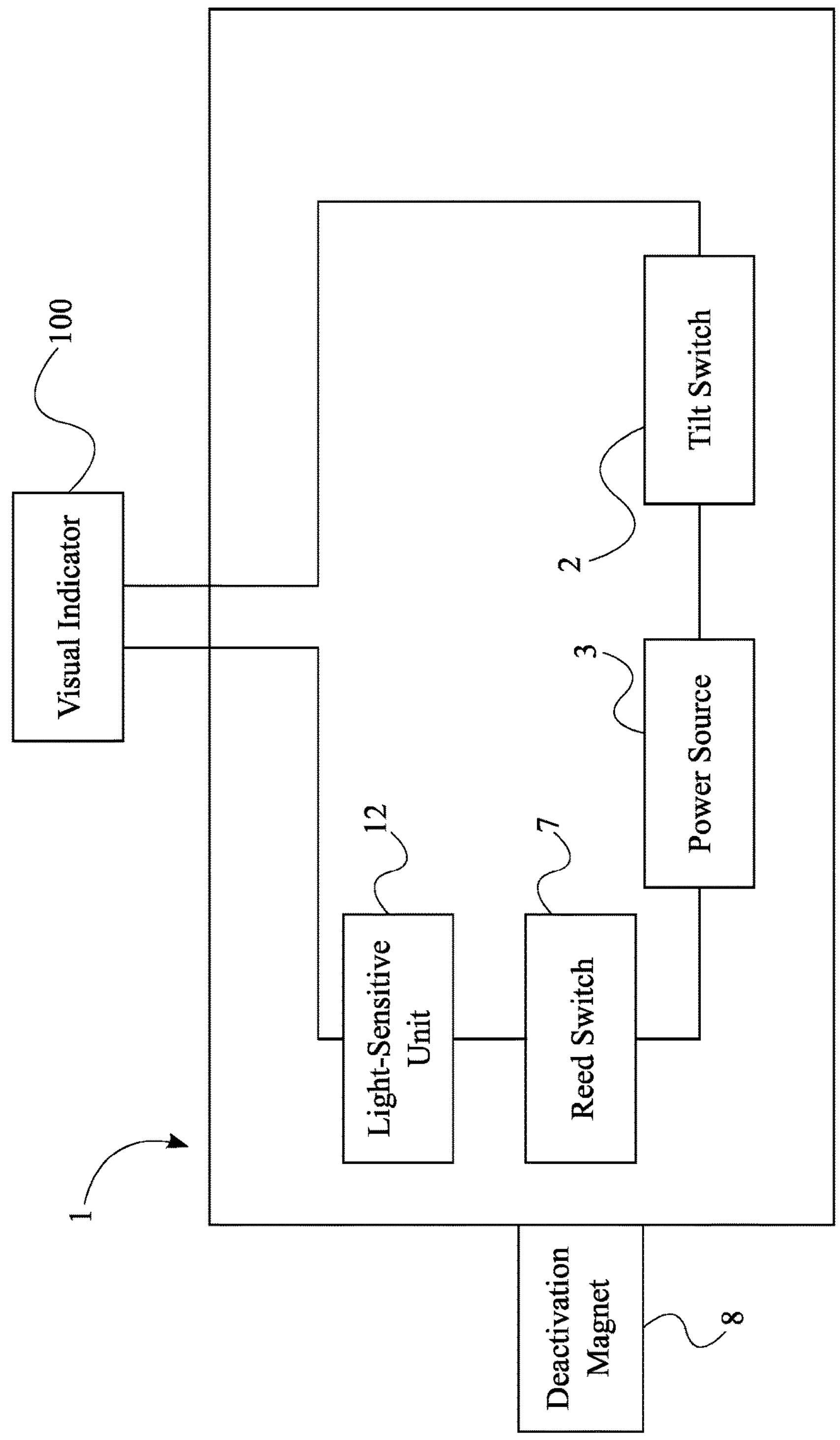
FIG. 8 is a block diagram illustrating the use of the light-sensitive unit.

When the fuse tube 200 is detached during high-visibility conditions, the detached fuse tube 200 can be clearly seen. Illuminating the visual indicator 100 in such situations may not be essential and can result in the depletion of the power source 3. To avoid such situations, the present invention further comprises a light-sensitive unit 12 as shown in FIG. 8. The light-sensitive unit 12, which is electrically connected to the power source 3, analyzes the environmental conditions of the present invention and ensures that the visual indicator 100 is illuminated only in low light conditions. Therefore, the overall depletion of the power source 3 is minimized. To do so, the light-sensitive unit 12 is electronically connected to the tilt switch 2 and the visual indicator 100. Moreover, the light-sensitive unit 12 is mounted to the structural body 1 so that the environmental conditions can be accurately analyzed. However, the light-sensitive unit 12 can also be positioned within the structural body 1 with an opening specifically designed to provide light to the light-sensitive unit 12.

As illustrated in FIG. 7, the present invention further comprises a solar charging panel 17 for recharging the power source 3. To do so, the solar charging panel 17 is electrically connected to the power source 3 and mounted onto the structural body 1.

Figure 9:
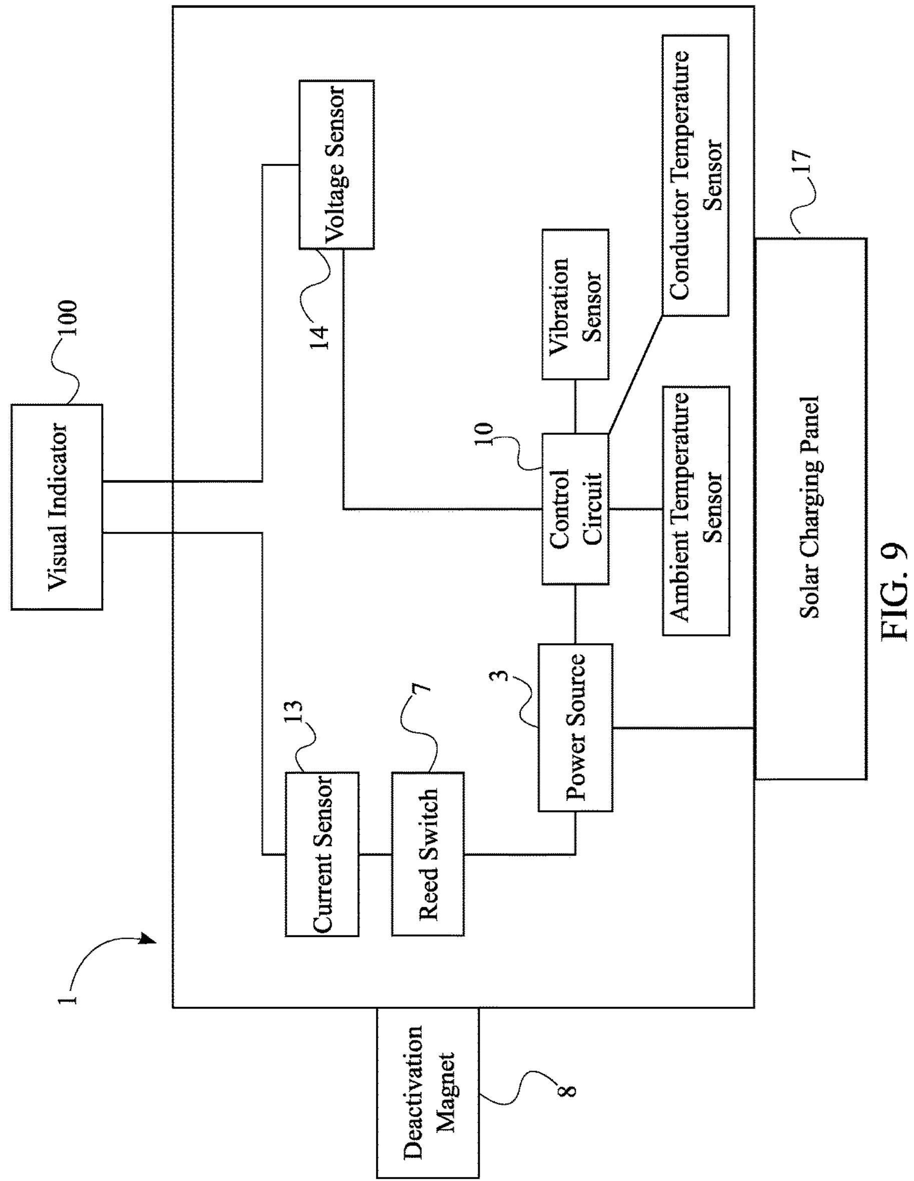
FIG. 9 is a block diagram illustrating the use of the current sensor and the voltage sensor.

The effective design also allows the present invention to be used with electric utility transmission lines or distribution conductors. As an example, the present invention can be used to monitor voltage, current, conductor temperature, ambient temperature, and conductor vibration. In such instances, the present invention further comprises a current sensor 13 as shown in FIG. 9. The current sensor 13, which is electrically connected to the power source 3, is used to detect a current overload in the conductor. To transfer information regarding the current overload, the current sensor 13 is electronically connected to the control circuit 10. When an overload or fault is detected, the visual indicator 100 is illuminated as discussed previously. To do so, the control circuit 10 and the visual indicator 100 are electronically connected to each other. Moreover, the control circuit 10 will be equipped with predetermined thresholds to accurately respond to signals received from the sensors.

In addition to the current sensor 13, the present invention can further comprise a voltage sensor 14 to sense line voltage for abnormal voltage conditions. As further seen in FIG. 9, the voltage sensor 14 will also be electrically connected to the power source 3. Moreover, to transfer information regarding the faulty voltage conditions, the voltage sensor 14 is electronically connected to the control circuit 10. To illuminate the visual indicator 100 when required, the control circuit 10 and the visual indicator 100 are electronically connected to each other. In addition to the current sensor 13 and the voltage sensor 14, the present invention can further comprise sensors for conductor temperature, ambient temperature, and conductor vibration as illustrated in FIG. 9. Moreover, the present invention can further comprise a down conductor which can be mounted onto the structural body 1.

Figure 10:
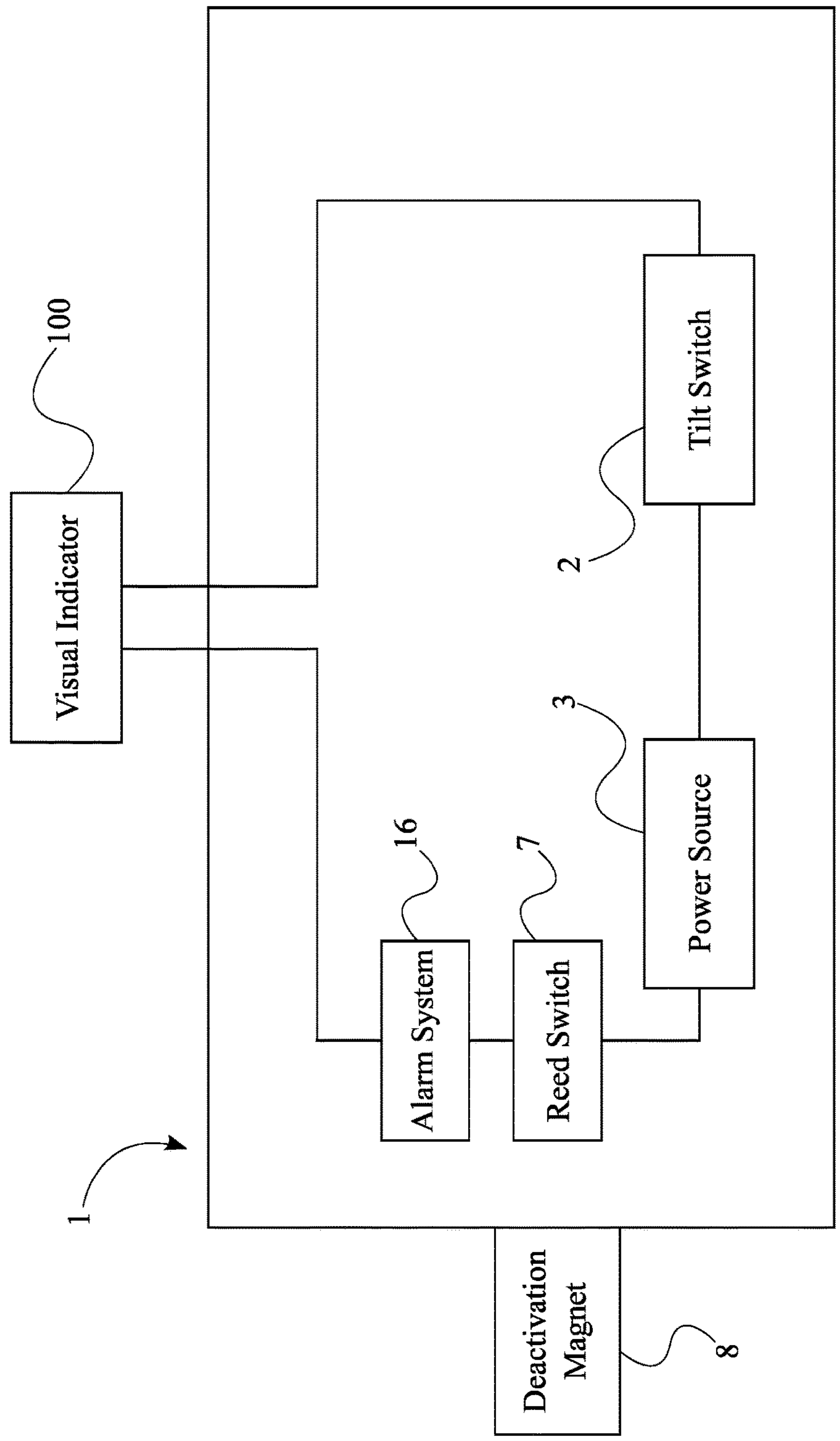
FIG. 10 is a block diagram illustrating the use of the alarm system.

The present invention can also be designed to provide audio alerts when the fuse tube 200 is detached. As shown in FIG. 10, the present invention further comprises an alarm system 16 which is electrically connected to the power source 3. The tilt switch 2, the visual indicator 100, and the alarm system 16 are electronically connected to each other. Therefore, when the tilt switch 2 is triggered the visual indicator 100 is illuminated. Simultaneously, the alarm system 16 also outputs and audio alert.

Hot sticks are used in maintenance and other distribution line related activity. The present invention comprises a hot stick attachment loop 15 that allows the present invention to be installed with the use of a hot stick. The hot stick attachment loop 15 is used to mount the present invention in parallel with the fuse tube 200. To do so, the hot stick attachment loop 15 is externally mounted onto the structural body 1. Moreover, the hot stick attachment loop 15 is positioned opposite the attachment mechanism 4 so that the attachment of the present invention onto the fuse tube 200 is not hindered.

When using the present invention, the following process flow is generally followed. If the present invention is being transported from one place to another or if the present invention is not used on the fuse tube 200, the deactivation magnet 8 is used. The deactivation magnet 8 is attached to the structural body 1 so that the reed switch 7 diverts current away from the visual indicator 100. When the present invention is prepared for use, the deactivation magnet 8 is removed. Removing of the deactivation magnet 8 allows the tilt switch 2 to activate the visual indicator 100 when needed.

The first mounting clip 5 and the second mounting clip 6 are used to attach the present invention to the fuse tube 200. In doing so, a twisting motion is executed to attach the first mounting clip 5 and the second mounting clip 6 onto the fuse tube 200. However, the present invention can be attached differently when the attachment mechanism 4 is different in another embodiment of the present invention. When a hot stick is used to position the present invention on a fuse cutout, the hot stick attachment loop 15 is utilized.

Figure 5:
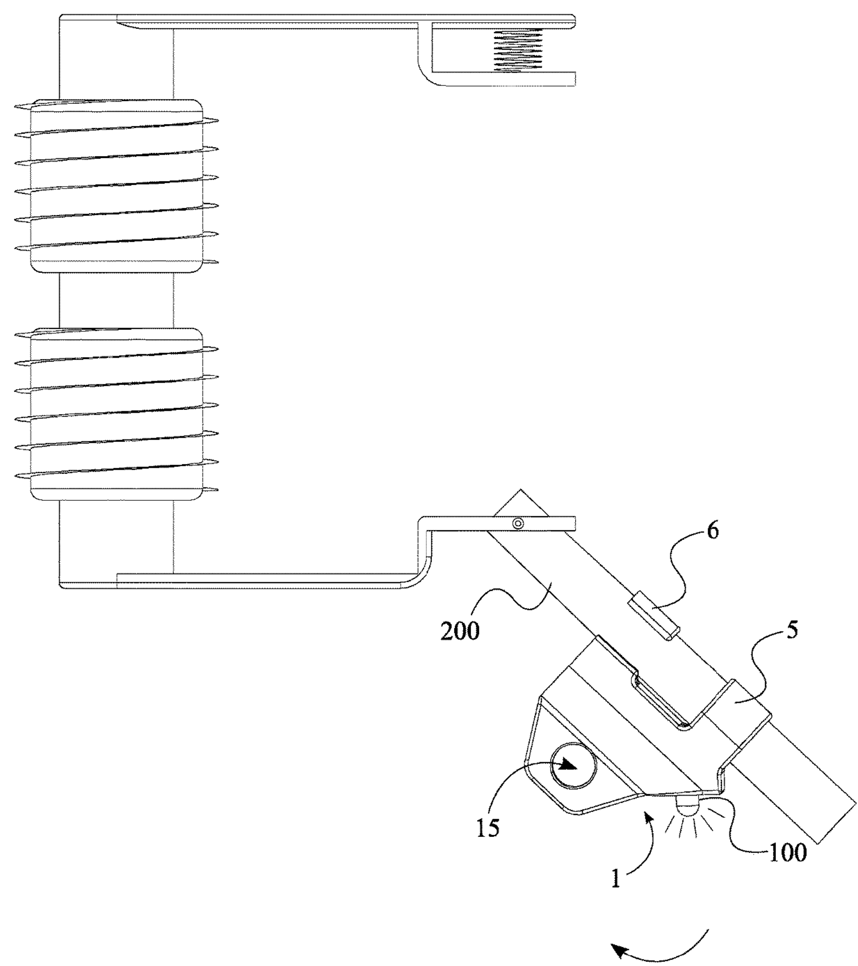
FIG. 5 is an illustration of the present invention attached to the fuse tube, wherein the fuse tube is detached from the fuse cutout to a dropped position.

As seen in FIG. 4, when the fuse tube 200 is in a vertical position, the visual indicator 100 will not be illuminated since the tilt switch 2 is not triggered. However, as shown in FIG. 5, when the vertical position of the fuse tube 200 changes from being attached to the fuse cutout to being detached from the fuse cutout, the tilt switch 2 is triggered. Thus, the visual indicator 100 is illuminated to notify the detachment of the fuse tube 200. If the wireless communication device 9 is available, information related to the detachment will be transmitted through the wireless communication device 9. If available, the alarm system 16 is also triggered. Therefore, the detachment of the fuse tube 200 can be addressed promptly.

Although the invention has been explained in relation to its preferred embodiment, it is to be understood that many other possible modifications and variations can be made without departing from the spirit and scope of the invention as hereinafter claimed.

What is claimed is:

1. A fuse cutout monitoring and indication device comprising:

a structural body;

a tilt switch;

a power source;

a visual indicator;

an attachment mechanism;

the power source being electrically connected to the tilt switch and the visual indicator;

the tilt switch and the visual indicator being electronically connected to each other;

the tilt switch and the power source being positioned within the structural body;

the visual indicator protruding from the structural body;

the attachment mechanism being externally connected to the structural body;

the attachment mechanism comprising a first mounting clip and a second mounting clip;

the first mounting clip and the second mounting clip being connected to the structural body;

the first mounting clip being positioned adjacent the second mounting clip; and the first mounting clip and the second mounting clip being directionally opposed to each other, wherein the first mounting clip and the second mounting clip are axially aligned to each other.

2. The fuse cutout monitoring and indication device as claimed in claim 1 further comprising:

a reed switch;

a deactivation magnet;

the power source being electrically connected to the reed switch;

the tilt switch, the visual indicator, and the reed switch being electronically connected to each other;

the deactivation magnet being removably mounted onto the structural body; and the reed switch being positioned within the structural body, wherein the reed switch is within a magnetic field of the deactivation magnet.

3. The fuse cutout monitoring and indication device as claimed in claim 1 further comprising:

a wireless communication device;

a control circuit;

the power source being electrically connected to the wireless communication device;

the tilt switch, the control circuit, the visual indicator, and the wireless communication device being electronically connected to each other;

the control circuit being positioned within the structural body; and the wireless communication device being positioned within the structural body.

4. The fuse cutout monitoring and indication device as claimed in claim 3 further comprising:

a global positioning system (GPS) module;

the power source being electrically connected to the GPS module; and the GPS module being electronically connected to the wireless communication device and the control circuit.

5. The fuse cutout monitoring and indication device as claimed in claim 1 further comprising:

a light-sensitive unit;

the power source being electrically connected to the light-sensitive unit; and the light-sensitive unit being electronically connected to the tilt switch and the visual indicator.

6. The fuse cutout monitoring and indication device as claimed in claim 5, wherein the light-sensitive unit is positioned within the structural body.

7. The fuse cutout monitoring and indication device as claimed in claim 5, wherein the light-sensitive unit is mounted onto the structural body.

8. The fuse cutout monitoring and indication device as claimed in claim 1 further comprising:

a solar charging panel;

the solar charging panel being mounted onto the structural body; and the power source being electrically connected to the solar charging panel.

9. The fuse cutout monitoring and indication device as claimed in claim 1 further comprising:

a current sensor;

a control circuit;

the power source being electrically connected to the current sensor;

the current sensor being electronically connected to the control circuit; and the control circuit being electronically connected to the visual indicator.

10. The fuse cutout monitoring and indication device as claimed in claim 1 further comprising:

a voltage sensor;

a control circuit;

the power source being electrically connected to the voltage sensor;

the voltage sensor being electronically connected to the control circuit; and the control circuit being electronically connected to the visual indicator.

11. The fuse cutout monitoring and indication device as claimed in claim 1 further comprising:

an alarm system;

the power source being electrically connected to the alarm system; and the tilt switch, the visual indicator, and the alarm system being electronically connected to each other.

12. The fuse cutout monitoring and indication device as claimed in claim 1 further comprising:

a hot stick attachment loop;

the hot stick attachment loop being externally mounted onto the structural body; and the hot stick attachment loop being positioned opposite to the attachment mechanism.

13. The fuse cutout monitoring and indication device as claimed in claim 1, wherein the visual indicator is at least one light emitting diode (LED).

* * * * *